W. S. HUTCHINSON.
STORAGE BATTERY GRID.
APPLICATION FILED JULY 16, 1913.
1,159,035.
Patented Nov. 2, 1915.
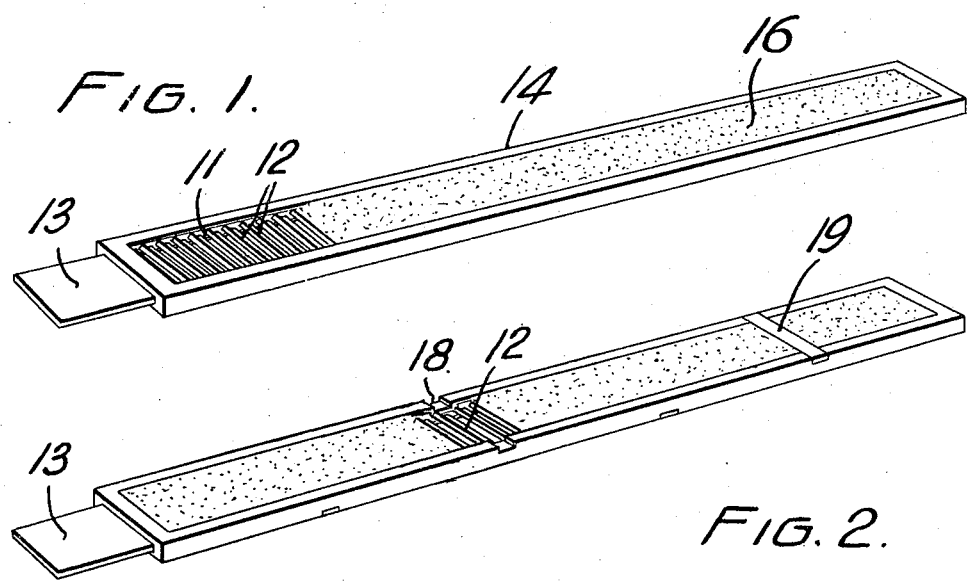
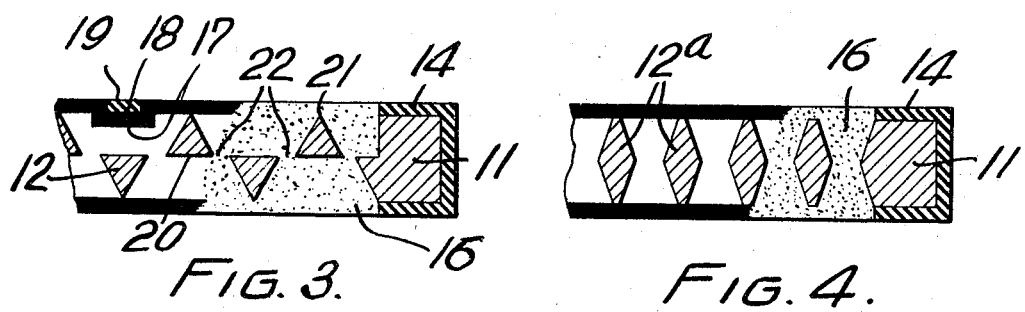
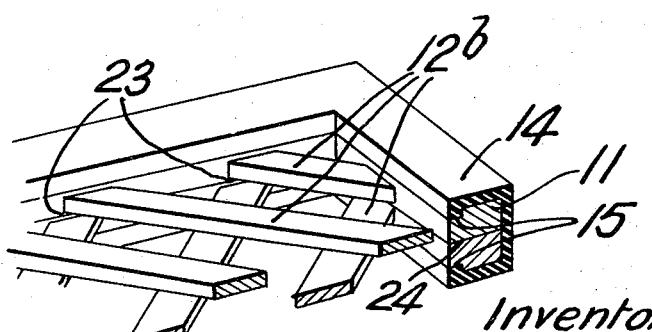
Witnesses
Inventor
W. S. Hutchinson
By
His Attorney

UNITED STATES PATENT OFFICE.

WILLIAM SCOTT HUTCHINSON, OF MONTREAL, QUEBEC, CANADA.

STORAGE-BATTERY GRID.

1,159,035.　　　　Specification of Letters Patent.　　Patented Nov. 2, 1915.

Application filed July 16, 1913. Serial No. 779,371.

*To all whom it may concern:*

Be it known that I, WILLIAM SCOTT HUTCHINSON, a subject of the King of Great Britain, and resident of the city of Montreal, in the Province of Quebec and Dominion of Canada, have invented certain new and useful Improvements in Storage-Battery Grids, of which the following is a full, clear, and exact description.

This invention relates to improvements in grids for use in the manufacture of storage batteries, and the object is to provide metal grids of great strength and durability so insulated that they may be assembled side by side to form battery plates.

A further object is to provide a grid so designed that the active material supported thereby will form a continuous mass throughout the grid, thus reducing the liability of shedding to a minimum.

A still further object is to provide a grid so arranged that a maximum amount of active material may be supported by a minimum weight of grid metal.

Various other objects and advantages will be apparent to those skilled in the art to which the invention relates on perusal of the following description.

The grid consists essentially of a rectangular framework insulated by having its peripheral members inclosed in a casing of vulcanite or other suitable insulating material, so that two or more grids may be assembled without any electric connection being made therebetween, either through the grids themselves or through the electrolyte from the edge of one grid to the edge of another.

In the drawings which illustrate the invention:—Figure 1 is a perspective view of a grid pasted with the active material except at one end, which is left bare to disclose the supporting bars. Fig. 2 is a perspective view of a grid similar to Fig. 1, but provided with insulating cross bars adapted to strengthen the grid and retain the active material. Fig. 3 is a fragmentary longitudinal section of a grid showing the preferred form of grid structure, the peripheral insulating and insulating cross bars. Fig. 4 is a view similar to Fig. 2, showing an alternative form of grid structure. Fig. 5 is a perspective view showing a further alternative form of grid structure.

Referring more particularly to the drawings, 11 designates a rectangular framework having formed integral therewith a plurality of cross bars 12 arranged in any suitable manner. At one end of the grid, an attaching tongue 13 of metal is provided adapted to be secured to a bus bar of the battery. Each of the four peripheral members of the grid is surrounded on at least three sides by a casing of insulating material 14 such as vulcanite. In order to insure the retention of this insulation in case of fracture, the grid may be provided with grooves or rabbets 15, shown in Fig. 5, in which the insulation engages. The cross bars 12 of the grid are coated with active material 16 preferably in the form of paste, which is applied in sufficient quantity to be flush with the surface of the insulation at the sides of the grid, as clearly shown in Figs. 1 and 2.

In order to strengthen the grid, and aid in supporting the active material, the longitudinal side members may be provided with transverse notches 17 arranged alternately on opposite sides of the grid. The coating of insulating material when applied in uniform thickness on the grid leaves depressions or notches 18 in which the ends of cross bars 19 of insulating material may be cemented or otherwise secured. These notches are necessary in order that the outer surface of the cross bars may be flush with the surface of the grid, as shown in Fig. 2.

The grid bars 12 may be arranged in any suitable manner, the preferred arrangement being shown in Figs. 1, 2 and 3. This preferred form consists of bars triangular in cross section arranged with their bases 20 at or near the center, and their apices 21 near the sides of the grid, as clearly shown in Fig. 3, and arranged alternately on opposite sides of the center. The bases of these bars are spaced sufficiently apart, as shown at 22, to enable the active material to form a continuous mass from side to side of the grid. In the same way, the apices of the bars being sunk below the side surfaces enable the material to form a continuous mass from end to end of the grid. Thus, all the active material forms a continuous mass throughout the grid and is thereby greatly strengthened. The triangular shape of the bars provides a maximum of contact surface compared with the volume of the bars, so that a maximum of electric contact surface is provided with a minimum weight of material. It will further be seen that this arrangement of bars also enables a much larger volume of active material to be supported in comparison with the volume of the bars than is possible with any other form of bars. In Fig. 4, the bars 12ª are substantially diamond shaped in cross section. This form of grid is slightly more rigid than the preferred form, but contains much greater weight of metal and much less weight of active material, which is furthermore insecurely held.

In Fig. 5, the bars 12ᵇ are shown diagonally arranged in two parallel planes, so as to form a lattice. The two sets of bars in this form may be separated by a space 23 at the center, so that the active material will form a continuous mass throughout the grid and a maximum of contact surface be obtained. This latter form of grid may be made in two parts joined together at the line 24 and secured by soldered screws, rivets or any other suitable means. This form more nearly approaches the efficiency of the form shown in Fig. 3, but is slightly more expensive to manufacture. If desired, the triangular bars of the preferred form may be used in place of the rectangular bars of Fig. 5.

While I have shown the preferred form of my invention and two alternatives, it is obvious that a large number of minor changes may be made in the shape and arrangement of the various parts without departing from the spirit of the invention, which embraces essentially a metal grid of minimum weight coated at the edges with insulating material, so that when assembled in plates, each grid will be electrically separate from adjacent grids.

Having thus described my invention, what I claim is:—

1. In a storage battery grid, a columnar grid unit having a frame of conducting material carrying active material, a peripheral covering of insulating material for the exposed portions of said frame, and bars of insulating material connecting the covering on opposite sides of the frame, said peripheral insulation having cut-out portions adapted to receive said transverse bars.

2. In a storage battery grid, an edge bar, substantially channel shaped insulation into which said edge bar fits tightly, whereby the edge bar is protected from battery solution, spaced enlarged portions having channels cut therein formed in said insulation, and transverse bars of insulating material, said channels being adapted to receive said transverse bars.

3. In a storage battery grid having a frame, each side bar of the frame having spaced grooves, substantially channel shaped insulation into which said bars fit tightly, spaced enlarged portions on said insulation fitting in said grooves in said bars, grooves formed in the enlarged portions of said insulation and bars of insulating material, fitting in said grooves and connecting the side bars of the frame.

4. In a storage battery grid having longitudinal grid members formed of active material, transverse grooves formed at intervals in said longitudinal grid members, a continuous covering of insulating material on the side and edge faces of the peripheral grid members, conforming to the contour of said members, whereby said transverse grooves will be maintained, and transverse bars of insulating material extending from edge to edge of the grid having their opposite extremities secured in said grooves.

In witness whereof I have hereunto set my hand in the presence of two witnesses.

WILLIAM SCOTT HUTCHINSON.

Witnesses:
 S. R. W. ALLEN,
 G. M. MORELAND.

Copies of this patent may be obtained for five cents each, by addressing the "Commissioner of Patents. Washington, D. C."